US009266200B2

United States Patent
Caspall

(10) Patent No.: US 9,266,200 B2
(45) Date of Patent: Feb. 23, 2016

(54) METHOD OF MANUFACTURING ROLLER BEARING CAGE

(75) Inventor: Martin Janek Caspall, King's Lynn Norfolk (GB)

(73) Assignee: Cooper Roller Bearings Company Ltd., Norfolk (GB)

( * ) Notice: Subject to any disclaimer, the term of this patent is extended or adjusted under 35 U.S.C. 154(b) by 23 days.

(21) Appl. No.: 14/007,238

(22) PCT Filed: Mar. 6, 2012

(86) PCT No.: PCT/GB2012/050496
§ 371 (c)(1),
(2), (4) Date: Mar. 6, 2014

(87) PCT Pub. No.: WO2012/131319
PCT Pub. Date: Oct. 4, 2012

(65) Prior Publication Data
US 2014/0193112 A1 Jul. 10, 2014

(30) Foreign Application Priority Data
Mar. 28, 2011 (GB) .................... 1105122.4

(51) Int. Cl.
F16C 19/26 (2006.01)
F16C 33/46 (2006.01)
(Continued)

(52) U.S. Cl.
CPC ........... B23P 15/003 (2013.01); F16C 33/4629 (2013.01); F16C 33/4641 (2013.01);
(Continued)

(58) Field of Classification Search
CPC ............. F16C 33/4641; F16C 33/4647; F16C 33/4652; F16C 33/467; F16C 33/4676; F16C 33/4694; F16C 33/516; F16C 33/4629; F16C 33/504; F16C 19/26; Y10T 29/49691
See application file for complete search history.

(56) References Cited

U.S. PATENT DOCUMENTS 543,262 A * 7/1895 Mossberg ............... 384/579
3,199,935 A * 8/1965 Pitner .................... 384/573
(Continued)

FOREIGN PATENT DOCUMENTS

DE 80 08 271 U1 6/1980
DE 19519798 A1 12/1995
(Continued)

OTHER PUBLICATIONS

International Search Report of International Application No. PCT/GB2012/050496 dated May 14, 2012.
(Continued)

*Primary Examiner* — Alan B Waits
(74) *Attorney, Agent, or Firm* — Fay Sharpe LLP

(57) ABSTRACT

A method of manufacturing a roller cage for mounting rollers around a circle in a bearing includes a) making a roller cage blank of cylindrical form, b) cutting the cage blank on opposite diagonal sides to form two generally semi-cylindrical halves, c) re-assembling the two semi-cylindrical halves of the cage blank by releasably clamping adjacent cut edges of each semi-cylindrical half together, and d) either before or after the cutting step, forming pockets for mounting a set of rollers in the cage on a circle about the axis of the reassembled cage. The last step d) allows one to provide pockets which mount the rollers in the correct position relative to the axis of the bearing even though the two semi-cylindrical halves when re-assembled no longer form a circle.

9 Claims, 7 Drawing Sheets

(51) Int. Cl.
  *B23P 15/00* (2006.01)
  *F16C 33/50* (2006.01)
  *F16C 33/51* (2006.01)

(52) U.S. Cl.
  CPC .......... *F16C33/4676* (2013.01); *F16C 33/504* (2013.01); *F16C 33/516* (2013.01); *F16C 19/26* (2013.01); *Y10T 29/49691* (2015.01)

(56) References Cited

U.S. PATENT DOCUMENTS

| | | | |
|---|---|---|---|
| 3,251,118 A * | 5/1966 | Pitner | 29/898.067 |
| 3,431,037 A * | 3/1969 | Benson | 384/580 |
| 3,494,684 A * | 2/1970 | Benson | 384/580 |
| T102,401 I4 | 11/1982 | Toth | |
| 4,475,777 A * | 10/1984 | Hofmann et al. | 384/572 |
| 5,184,899 A * | 2/1993 | Harimoto | 384/560 |
| 5,261,159 A | 11/1993 | Yasuda et al. | |
| 5,630,669 A | 5/1997 | Stewart | |
| 6,666,584 B2 * | 12/2003 | Yokota | 384/577 |
| 6,692,156 B1 * | 2/2004 | Ohura et al. | 384/523 |
| 6,981,801 B2 * | 1/2006 | Yokota | 384/577 |
| 7,258,492 B2 * | 8/2007 | Yoon | 384/523 |
| 7,270,484 B2 * | 9/2007 | Waseda | 384/570 |
| 7,866,891 B2 * | 1/2011 | Waseda et al. | 384/457 |
| 8,057,105 B2 * | 11/2011 | Earthrowl et al. | 384/577 |
| 8,136,998 B2 * | 3/2012 | Murata et al. | 384/570 |
| 2007/0116393 A1 * | 5/2007 | Oishi et al. | 384/457 |
| 2012/0211470 A1 * | 8/2012 | Webster et al. | 219/69.17 |

FOREIGN PATENT DOCUMENTS

| | | | |
|---|---|---|---|
| GB | 961203 A * | 6/1964 | |
| JP | H05-89952 U | 12/1993 | |
| JP | 2000211470 A1 * | 9/2000 | |
| WO | WO 2013175922 A1 * | 11/2013 | |

OTHER PUBLICATIONS

Written Opinion of International Application No. PCT/GB2012/050496 dated May 14, 2012.

* cited by examiner

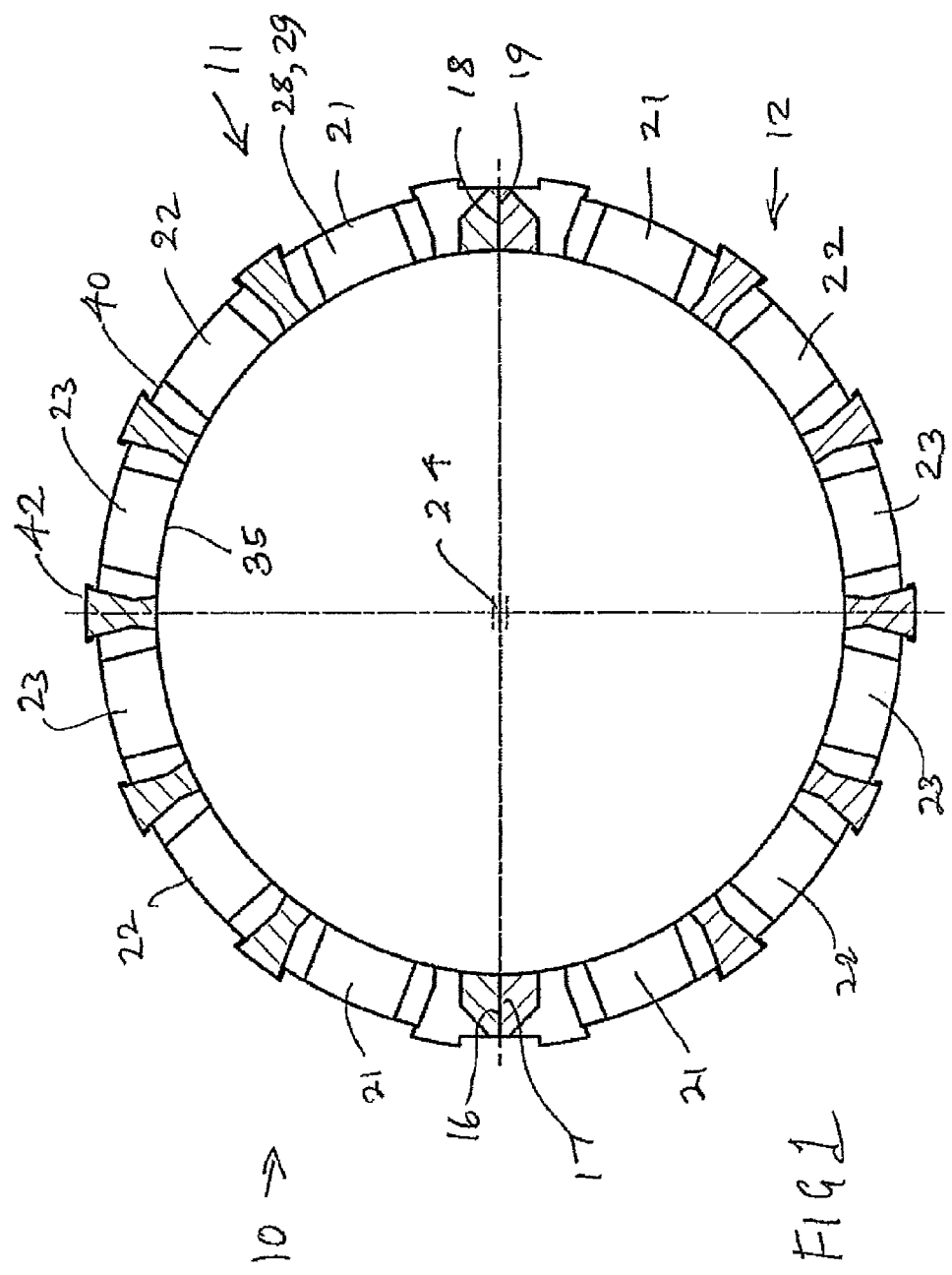

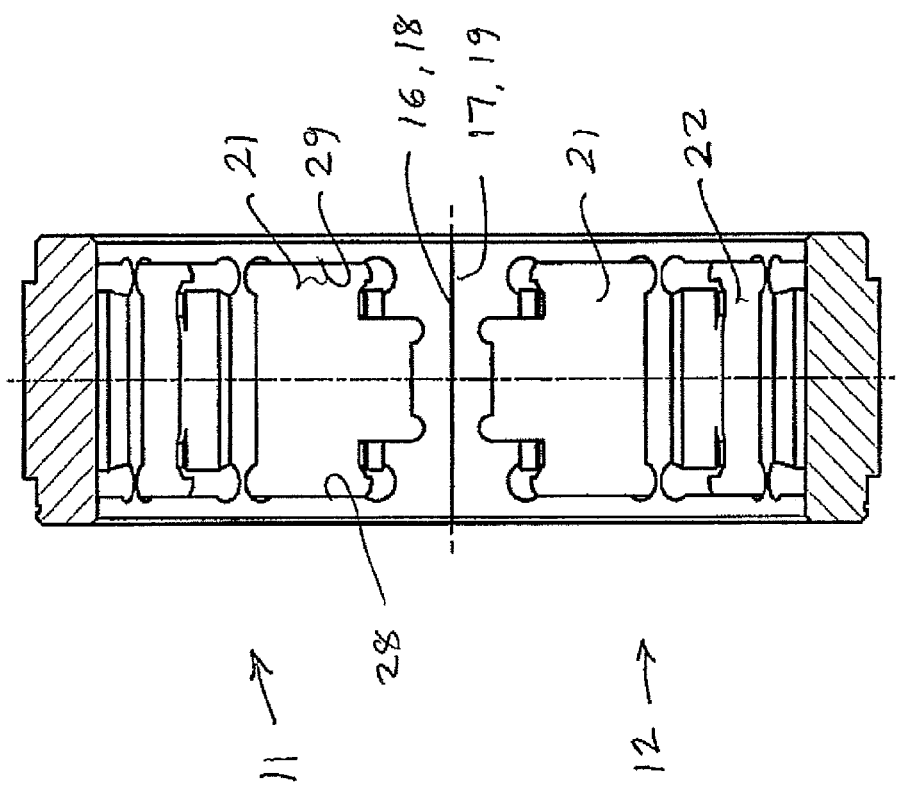

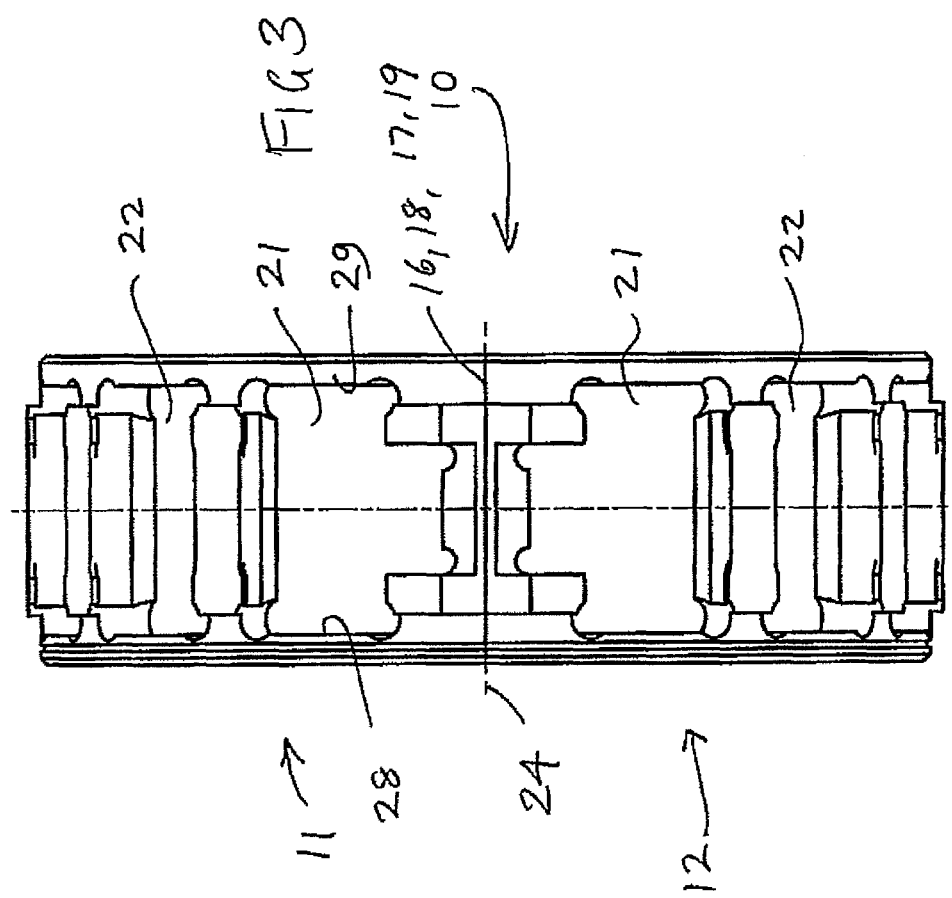

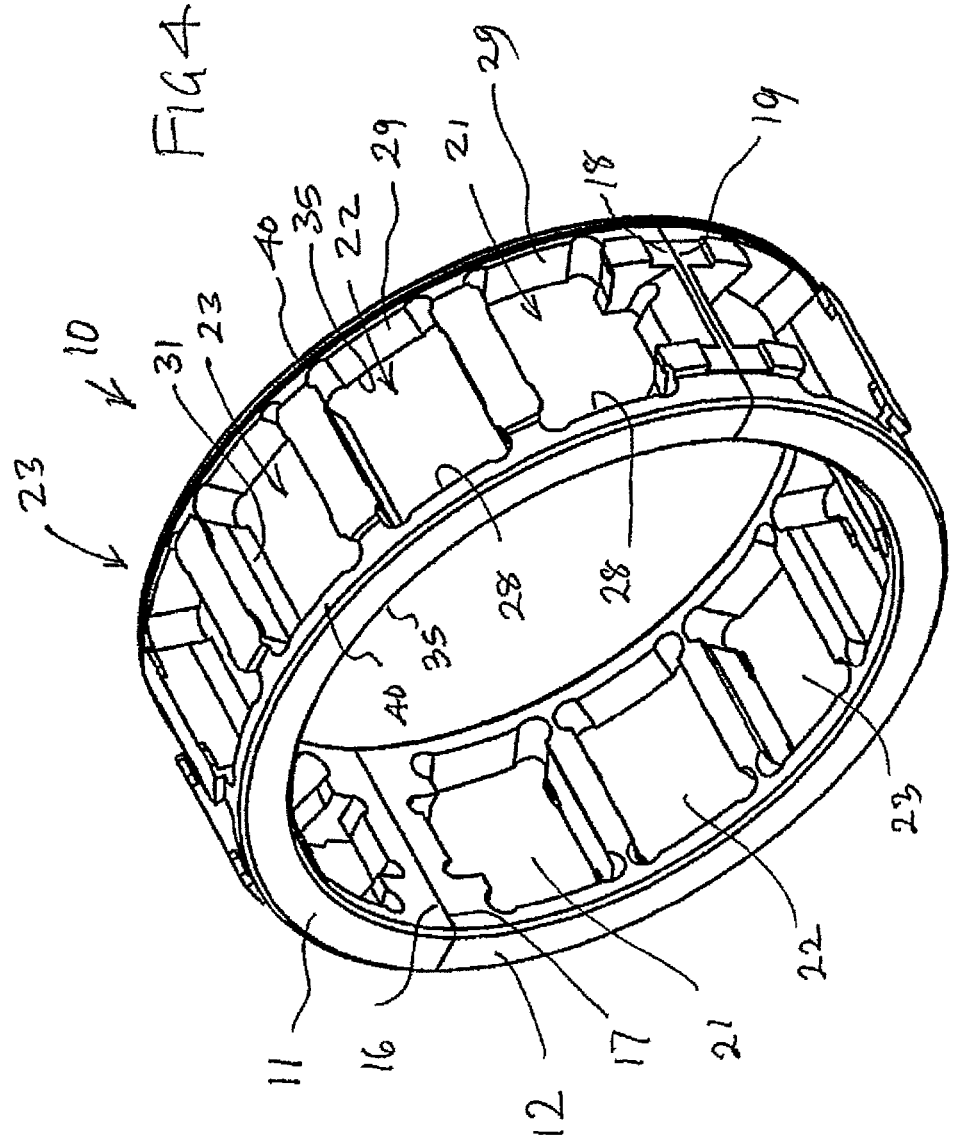

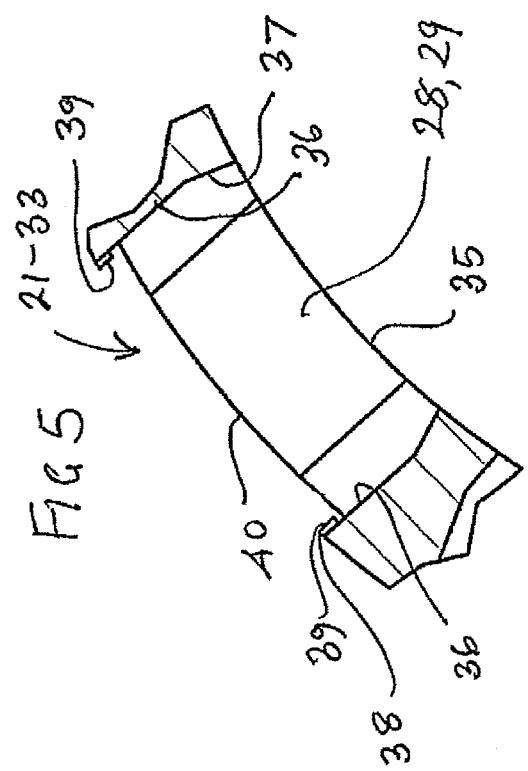

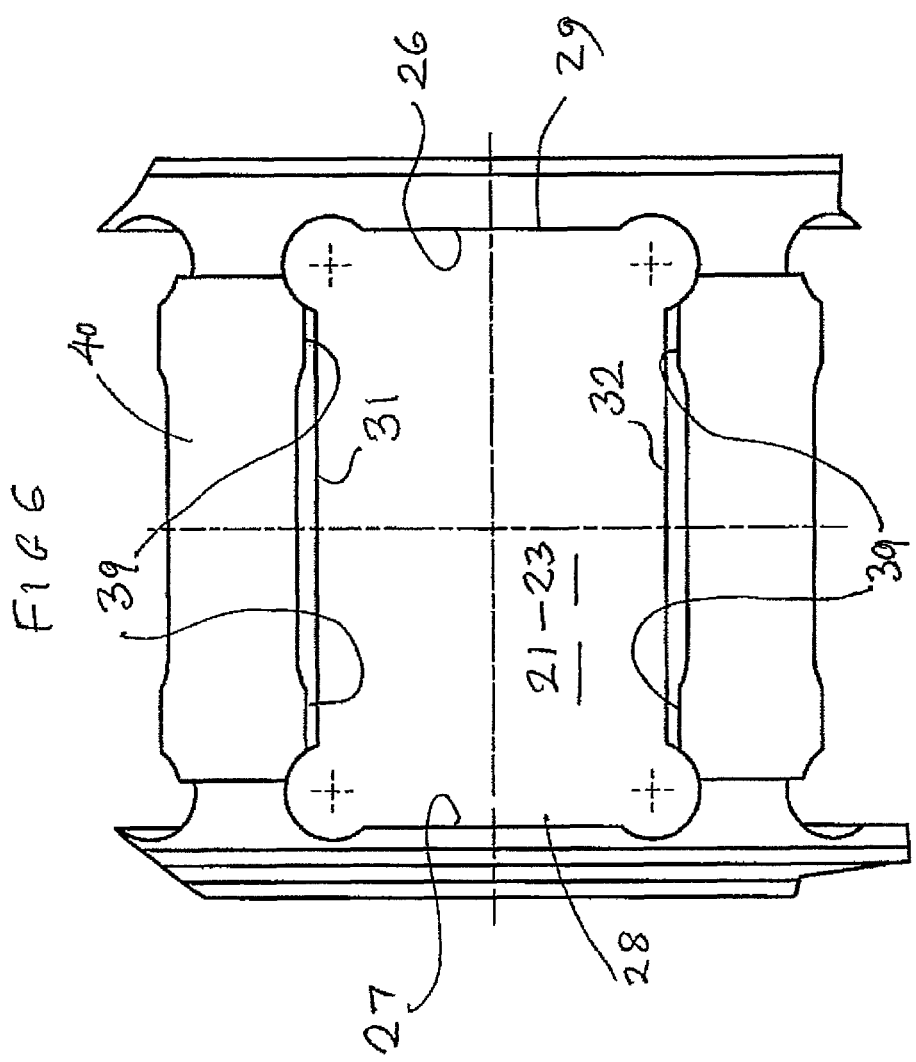

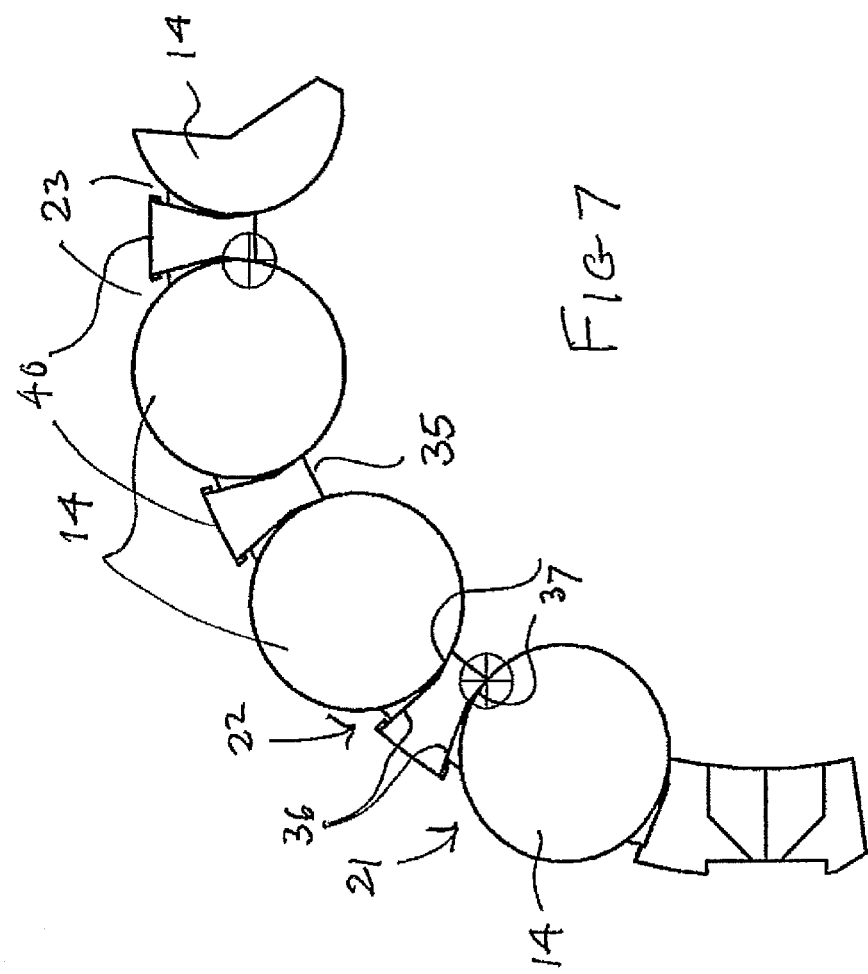

METHOD OF MANUFACTURING ROLLER BEARING CAGE

BACKGROUND OF THE INVENTION

The present invention relates to a method of manufacturing a roller bearing cage.

Roller bearings are used to provide rotation between two relatively rotating parts, the roller bearing comprising an outer race for mounting to the outer of the two relatively rotating parts, an inner race for mounting to the inner of the two relatively rotating parts, and a set of rollers between the two races, the rollers being mounted in a cage whereby to space the rollers apart. Such an arrangement is well known.

In heavy duty applications, the cage is normally of a metal, such as brass or bronze, and is manufactured as a generally cylindrical item.

However, to allow for the rollers to be replaced, the inner and outer races and the cage may each be provided in two semi-cylindrical halves which are releasably held together. In this way, one half of the outer race may be removed and the cage rotated to successively remove each half of the cage whereby the rollers may be readily replaced when worn. In the case where the cage is made of metal, during manufacture, the initial metal is machined to a cylindrical structure to form a cage blank. However, in the process of cutting the initial cage blank into two semi-cylindrical halves, some of the metal is removed and when the two semi-cylindrical halves are re-engaged with one another (cut edge to cut edge), they will no longer form a circle.

This is normally dealt with by providing spacers between the two semi-cylindrical halves to the cage of a thickness (parallel to the circumference of the cage) to compensate for the material which has been removed in the cutting process but this means that the two semi-cylindrical halves do not directly abut one another which can introduce a lack of rigidity.

The spacer may typically form part of a clip which holds the two semi-cylindrical halves together after they have been reassembled.

As an alternative, the two semi-cylindrical halves may be re-assembled after they have been cut and clipped together without any spacers, so that the reassembled cage is not perfectly cylindrical, and the reassembled cage is re-machined to cylindrical shape. In this case, pockets to mount the rollers are machined in the reassembled cage. This method however adds an extra stage in the manufacturing process.

The present invention reduces or eliminates the necessity for this extra step and the use of spacers.

Through this specification we refer to "semi-cylindrical" halves. Generally the two halves will be produced by a straight cut from side to side of the cage blank through its axis but in some circumstances there may be two cuts may which are not in a line through the cage axis so one semi-cylindrical half may be longer arcuately than the other.

SUMMARY OF THE INVENTION

According to a first aspect, the present invention provides a method of manufacturing a roller bearing cage for mounting rollers around a circle in a bearing, said manufacturing method comprising:
  a) making a roller bearing cage blank of cylindrical form,
  b) cutting the cage blank on substantially opposite diagonal sides to form two substantially semi-cylindrical halves,
  c) re-assembling the two substantially semi-cylindrical halves of the cage blank by releasably connecting adjacent cut edges of each substantially semi-cylindrical half together, and
  d) either before or after the cutting step, forming pockets for mounting a set of rollers in the cage on a circle centred on the axis of the re-assembled cage.

The last step d) allows one to provide pockets which mount the rollers in the correct position relative to the axis of the bearing even though the two semi-cylindrical halves when re-assembled no longer form a circle.

The pocket forming step (d) may comprise selecting the positions of the pockets in the cage such as to compensate for the material which has been removed in the cutting step, whereby the axes of the rollers mounted in the pockets are set out on a circle about the cage axis when the cage is completed.

The pocket forming step may further comprise selecting, for pockets which are or will be furthest from the joints between the two substantially semi-cylindrical halves of the cage, a position further from an inner circumferential face of the cage than for the pockets which are or will be closest to the joints between the two substantially semi-cylindrical halves of the cage.

The pocket forming step may comprise selecting the shape of the pockets or their positions so that the position of a roller in the pocket is such as to compensate for the material which will be removed in the cutting step, whereby the axes of the rollers mounted in the pockets are set out on a circle about the cage axis when the cage is completed.

In this case, the pocket forming step may comprises providing for each pocket a selected width between opposite faces where a roller mounted in the pocket engages opposite faces of the pocket, selecting the width for pockets which are or will be furthest from the joints between the two substantially semi-cylindrical halves of the cage to be less than for the pockets which are closest to the joints between the two substantially semi-cylindrical halves of the cage so that a roller mounted therein will be further from the inner circumferential surface of the cage.

In this case, the width for each pocket may be chosen so that rollers mounted in the pockets furthest from these joints are held slightly further away from an inner circumferential surface of the cage thereby compensating for the loss of material in the cage caused by the cut and mounting the rollers in positions wherein their axes are on a circle centred on the cage axis.

Step (a) may comprise machining the roller cage blank from solid material such as brass or bronze.

The pocket forming step may include forming means in each pocket to prevent the rollers, when engaged in the pocket, from easily moving out of the pocket away from the axis of the cage so as to retain the rollers in the pockets during disassembly or reassembly.

In this case, the pocket forming step may include forming retaining lips on said opposite faces of the pocket prevent the rollers, when engaged in the pocket, from easily moving out of the pocket away from the axis of the cage so as to retain the rollers in the pockets during disassembly or reassembly.

The cutting step (b) may be carried out before or after the pocket forming step (d).

Step (c) may include releasably connecting adjacent cut edges of each substantially semi-cylindrical half together by means of a clamp such as a spring clamp The invention also comprises a roller bearing cage manufactured by the method of any of the preceding claims.

According to a further aspect, the invention comprises a roller bearing cage for mounting rollers around a circle in a bearing, said roller bearing cage comprising:

two substantially semi-cylindrical halves of the cage cut from a cylindrical cage blank and re-assembled by releasably connecting adjacent cut edges of each substantially semi-cylindrical half together, and pockets for mounting a set of rollers in the cage, the shape of the pockets or their positions being provided so that the position of a roller in the pocket is such as to compensate for the material removed in the cutting step, whereby the axes of the rollers mounted in the pockets are set out on a circle centred on the cage axis.

Preferably, the pockets which are furthest from joints between the two substantially semi-cylindrical halves of the cage are positioned further from an inner circumferential face of the cage than the pockets which are closest to the joints between the two substantially semi-cylindrical halves of the cage.

BRIEF DESCRIPTION OF THE DRAWINGS

A preferred embodiment of the invention will now be described by way of example only and with reference to the accompanying drawings in which:

FIG. 1 is an axial section of a cage according to the invention,

FIG. 2 is a vertical sectional view of the cage of FIG. 1,

FIG. 3 is a side view of the cage of FIG. 1,

FIG. 4 is a perspective view of the cage of FIG. 1,

FIG. 5 is an enlarged view of part of FIG. 1 showing detail of a pocket,

FIG. 6 is an enlarged external view of a pocket, and

FIG. 7 is an enlargement of part of FIG. 1 showing the positions of rollers mounted in the pockets.

DESCRIPTION OF PREFERRED EMBODIMENTS OF THE INVENTION

FIGS. 1, 2 and 3 show a roller bearing cage manufactured in accordance with the invention. The roller bearing cage 10 is of generally cylindrical form, and comprises two semi-cylindrical halves 11, 12 which have been reassembled with their cut edges 16, 17 and 18, 19 abutting one another. The roller bearing cage includes twelve pockets, the pockets closest to the cut edges being numbered 21, the pockets next closest to the cut edges being numbered 22, and the pockets further from the cut edges being numbered 23. The position of exemplary rollers are illustrated at 14 in FIG. 7.

The roller bearing cage 10 is manufactured of metal, for example, brass or bronze. In manufacture it is machined into substantially cylindrical form from solid material which may be a solid billet of material, or may be a cylinder which is roughly cast the correct shape. In each case a cylindrical cage blank is formed In a first preferred method of the invention, the next step of the manufacturing process comprises cutting the cage blank into two substantially semi-circular halves 11, 12, by cutting at diagonally opposite sides of the cage blank. Generally the cut lines 15, 20 will be in an axial plane containing the axis 24 of the cage.

Any cutting or sawing process separating the cage blank into two semi-circular halves will remove some metal. When the two semi-circular halves are reassembled together with their cut edges 16, 17 abutting one another and cut edges 18, 19 abutting one another, the form of the cage blank will no longer be circular but will be distorted by the removal of that metal.

In accordance with the present invention, however, the two semi-cylindrical halves are joined to one another by means, for example, of a releasable clip in such a manner that the cut edges of the semi-cylindrical halves abut one another. In this way, the cage will be more rigid. However, it is understood that whilst the cage is no longer a perfect ring form because of the removal of the metal in the cutting process, this is of little consequence. The main requirement is that the rollers 14 mounted in the pockets 21-23 in the finished cage must be mounted such that their axes 28 are mounted on a circle centred on the cage axis 24.

This can be provided by adjusting the radial position of the pockets 21-23 or their form so as to compensate for the removal of the metal in the cutting process.

Referring now to FIGS. 5 6, and 7, the form of the pockets 21-23 is shown in more detail.

In the manufacturing process, the pockets 21-23 may be machined in the cage blank either after the cage blank has been cut into two semi-cylindrical halves 11, 12 and reassembled with the cut edges abutting and two semi-cylindrical halves releasably clipped together (a first preferred method of the invention) or before the cage blank is cut into two semi-cylindrical halves 11, 12 (a second preferred method of the invention).

Each of the pockets 21-23 comprises, in essence, four surfaces, two end surfaces 28, 29 and two side surfaces 31, 32, The two end surfaces 28, 29 extend generally in two parallel spaced planes 28, 29 normal to the cage axis 24. These end surfaces 28, 29 limit the movement of a roller mounted in the pocket parallel to the roller axis. The two side surfaces 31, 32 are in respective planes, each plane being a radial plane from the cage axis 24 and being angularly spaced from one another about the axis 24. The side surfaces 31, 32 are not, in fact, exact planar surfaces but have different facets. The form of each side surface 31, 32 is clear from FIGS. 4 and 5. The side surfaces 31, 32 each comprise two facets 36, 37, facets 37 being closer to an inner circumferential face 35 of the cage 10 and the cage axis 24 than the facet 36. Facets 36 are nominally parallel to one another, although they can be formed at an angle up to 5° to each other. Facets 37 are formed at an angle to one another of 15-25°, preferably 20° plus or minus 2° (see FIG. 5). The facets 37 are those with which the roller usually engages when the bearing is assembled. The outermost edge 38 of the facet 36 includes means comprising a pair of small lips 39 to prevent a roller when engaged in the pocket from easily moving out of the pocket away from the axis of the cage.

As will be clear from FIGS. 5 and 7, the position of a roller in a pocket will depend upon the distance or width of the pocket where the roller engages the side surfaces 31, 32 and, in particular, the facets 37. If the side surfaces 31, 32 are further apart, then the roller will move further into the pocket towards the axis 24 whereas if the side surfaces 31, 32 are closer together, then the roller will not be able to move so close to the axis 24 and will be held further away from the axis. Thus, by machining the pockets 21-23 in such a way as to provide different distances between the side surfaces 31, 32 or, in particular, between the facets 37, one can arrange for the roller to be mounted in a particular radial position with respect to the cage axis 24. Such an arrangement requires that the pockets are machined to different forms. This may be inconvenient.

In an alternative preferred arrangement, the pockets 21-23 are machined to identical form but the initial position of the machining operation is selected to provide the pocket at a selected distance from an inner circumferential surface 35 of the re-assembled cage. This will mean that the machining step for different pockets will initiate at different distances from the inner circumferential 35 surface of the re-assembled cage blank to compensate for removal of metal in the cutting or sawing of the cage blank into two semi-cylindrical halves. If the pockets are cut before the cage blank is cut then is necessary to predetermine the thickness of metal removed in the cutting process and to determine the position of each pocket required to render the axes of the rollers 14 inserted in the pockets on a circle centred on the cage axis.

Referring now to FIG. 1, it will be clear that as material has been removed between the cut edges 16-19, then the uppermost point 42 of the upper semi-cylindrical half of the cage blank in FIG. 1 will be lower than before the cutting process. Thus if the axes 41 of the rollers 14 are to be on a circle centred on the axis 24, then the rollers which are adjacent the uppermost point 42 will have to be lifted so as to compensate for the material which has been removed in the cutting process. This can be done by, for example, by moving the facets 37 upwards. This has the effect that the distance between the facets 37 at their innermost extremities (i.e. where they meet the inner surface 35 of the cage) is reduced.

In FIG. 5, the distance A which is the distance between the facets at their inner extremities is measured in a typical example as, 11.03 mm, for pockets 23, 11.11 mm and for pockets 22, and 11.27 mm for pockets 21. However, the distance between facets 36 is equal in all pockets.

In this arrangement the machining process for each of the pockets may be identical, the only difference being that the start position of the machining is at a selected radial point for different pockets.

The operation of cutting the pockets 21-23 may be carried out before the cage blank is cut into two semi-cylindrical halves, in which case the orientation of the relevant pockets 21-23 to the positioning which the cut will take place should be determined in advance, and the cutting operation will cut the pockets 21-23 so as to compensate for the predicted amount of thickness of material which will be removed in the cutting process. Alternatively, the pockets 21-23 can be cut after the two semi-cylindrical halves are separated and reassembled with one another and clipped together by means of a clip such as a spring clip which engages with means adjacent the cut edges. 16-19.

The invention is not restricted to the details of the foregoing examples.

Facets 37 in each pocket could be towards the outer circumferential surface 40, with the retaining features 39 adjacent to the inner circumferential surface 35. With the arrangement described in the figures, wherein facets 37 are to the inside, the cage engages with portions of the roller surfaces to the inside of the pitch circle of the rollers 14, and when at rest the cage will drop onto and be supported by the rollers in the lower half of the bearing. In the alternative arrangement described in the previous paragraph, the cage will engage with portions of the roller surfaces to the outside of the pitch circle of the rollers, and when at rest the cage will 'hang' on the rollers in the upper half of the bearing.

The invention claimed is:

1. A roller bearing cage for mounting rollers around a circle in a bearing, said roller bearing cage comprising:
   two substantially semi-cylindrical halves of the cage cut from a cylindrical cage blank and re-assembled by connecting adjacent cut edges of each substantially semi-cylindrical half together, and
   a plurality of pockets for mounting said rollers in the cage, each of said rollers having a center axis, a shape of each of the plurality of pockets or their positions being provided so that the position of said rollers in the respective pockets are such as to compensate for the material removed in the a cutting step, whereby the center axes of the rollers mounted in the pockets are set out on a circle centered on the cage axis, and
   the pockets which are furthest from joints between the two substantially semi cylindrical halves of the cage are shaped such that radially innermost positions of the center axes of said rollers contained therein are further from an inner circumferential face of the cage than correspondingly radially innermost positions of the center axes for rollers in pockets which are closest to the joints between the two substantially semi-cylindrical halves of the cage.

2. The roller bearing cage of claim 1 wherein each of the plurality of pockets comprises a pair of end surfaces and first and second side surfaces.

3. The roller bearing cage of claim 2 wherein each of the first and second side surfaces comprises a first facet, wherein the first facet of the first side surface extends at an angle of about 15-25° to the facet of the second side surface.

4. The roller bearing cage of claim 2 wherein each of the first and second side surfaces includes a retaining lip located at a distal end of the respective side surface.

5. The roller bearing cage of claim 4 wherein the lip located at the distal end of each of the first and second side surfaces is positioned on a second facet located radically outwardly from a first facet.

6. The roller bearing cage of claim 1 further comprising a spring clamp for connecting the adjacent cut edges of each substantially semi-cylindrical half together.

7. The roller bearing cage of claim 6 wherein each of the plurality of pockets comprises a pair of end surfaces and first and second side surfaces.

8. The roller bearing cage of claim 7, wherein each of the first and second side surfaces of respective pockets comprise a first facet, wherein the first facet of the first side surface extends at an angle of about 15-25° to the facet of the second side surface.

9. The roller bearing cage of claim 8, wherein the first facets are arranged for respective pockets such that a roller contained within a pocket that is further from joints between the two substantially semi-cylindrical halves of the cage are further from an inner circumferential face of the cage than rollers contained in pockets closer to the joints.

* * * * *